(12) United States Patent
Flajslik et al.

(10) Patent No.: US 10,554,568 B2
(45) Date of Patent: Feb. 4, 2020

(54) TECHNOLOGIES FOR NETWORK ROUND-TRIP TIME ESTIMATION

(71) Applicant: Intel Corporation, Santa Clara, CA (US)

(72) Inventors: Mario Flajslik, Hudson, MA (US); James Dinan, Hudson, MA (US)

(73) Assignee: Intel Corporation, Santa Clara, CA (US)

(*) Notice: Subject to any disclaimer, the term of this patent is extended or adjusted under 35 U.S.C. 154(b) by 898 days.

(21) Appl. No.: 14/866,559

(22) Filed: Sep. 25, 2015

(65) Prior Publication Data

US 2017/0093731 A1    Mar. 30, 2017

(51) Int. Cl.
    *H04L 12/841*    (2013.01)
    *H04L 12/26*    (2006.01)

(52) U.S. Cl.
    CPC ............ *H04L 47/283* (2013.01); *H04L 43/12* (2013.01)

(58) Field of Classification Search
    CPC combination set(s) only.
    See application file for complete search history.

(56) References Cited

U.S. PATENT DOCUMENTS

| | | | |
|---|---|---|---|
| 9,420,513 B1 * | 8/2016 | Yalagandula | H04W 24/00 |
| 2002/0012320 A1 | 1/2002 | Ogier | |
| 2004/0117149 A1 * | 6/2004 | Engbrecht | H04L 41/5009 |
| | | | 702/182 |
| 2005/0198286 A1 * | 9/2005 | Xu | H04L 45/02 |
| | | | 709/225 |

(Continued)

FOREIGN PATENT DOCUMENTS

KR     10-1535721     7/2015

OTHER PUBLICATIONS

Math is Fun, Activity:Subsets Retrieved from: https://web.archive.org/web/20141230172553/https://www.mathsisfun.com/activity/subsets.html.*

(Continued)

*Primary Examiner* — Douglas B Blair
*Assistant Examiner* — Ishrat Rashid
(74) *Attorney, Agent, or Firm* — Barnes & Thornburg LLP (57) ABSTRACT

Technologies for estimating network round-trip times include a sender computing node in network communication with a set of neighboring computing nodes. The sender computing node is configured to determine the set of neighboring computing nodes, as well as a plurality of subsets of the set of neighboring computing nodes. Accordingly, the sender computing node generates a message queue for each of the plurality of subsets, each message queue including a probe message for each neighboring node in the subset to which the message queue corresponds. The sender computing node is further configured to determine a round-trip time for each message queue (i.e., subset of neighboring computing nodes) based on a duration of time between the first probe message of the message queue being transmitted and an acknowledgment being received in response to the last probe message of the message queue being transmitted. Additionally, the sender computing node is configured to estimate a round-trip time for each of the neighboring computing nodes based on the round-trip times determined for each message queue. Other embodiments are described and claimed.

25 Claims, 6 Drawing Sheets

(56) References Cited

U.S. PATENT DOCUMENTS

| | | | |
|---|---|---|---|
| 2007/0217343 A1* | 9/2007 | Znamova | H04J 3/0682 370/252 |
| 2010/0235845 A1* | 9/2010 | Bates | G06F 9/5044 718/105 |
| 2011/0243002 A1* | 10/2011 | Tsuruoka | H04W 24/04 370/252 |
| 2012/0307675 A1 | 12/2012 | Lusilao-Zodi | |
| 2013/0195344 A1* | 8/2013 | Marquiss | G01N 21/6454 382/133 |
| 2013/0337847 A1* | 12/2013 | Sridhara | G01S 5/14 455/456.6 |
| 2014/0219114 A1 | 8/2014 | Vasseur et al. | |

OTHER PUBLICATIONS

International Search Report for PCT/US16/048598, dated Dec. 7, 2016 (3 pages).
Written Opinion for PCT/US16/048598, dated Dec. 7, 2016 (7 pages).

* cited by examiner

TECHNOLOGIES FOR NETWORK ROUND-TRIP TIME ESTIMATION

BACKGROUND

Modern computing devices have become ubiquitous tools for personal, business, and social uses. As such, many modern computing devices are capable of connecting to various data networks, including the Internet and corporate intranets, to transmit and receive data communications over the various data networks at varying rates of speed. To facilitate communications between computing devices, the data networks typically include one or more computing nodes (e.g., network switches, network routers, servers, other compute and/or store computing devices, etc.) to route communications (i.e., network packets) from a source computing device to a destination computing device. Certain network infrastructures, such as data centers, may include tens of thousands or more of such computing nodes. To handle such large network infrastructures, adaptive routing technologies have evolved using topology information of the network infrastructure. Traditional methods to determine the topology of the network infrastructure may include one or more of the computing nodes identifying neighboring computing nodes (e.g., those computing nodes that are one hop from the identifying computing node) using static topology information, which cannot typically be applied to the adaptive routing technologies.

Accordingly, round-trip times between computing nodes can be used to augment the topology information and provide a better view of the network as a whole. Network round-trip time estimation has been extensively studied and implemented in the context of transmission control protocol (TCP) (e.g., Karn's algorithm), where round-trip time is a critical measurement that establishes protocol timeout values. In support of such round-trip time estimation, some network hardware (e.g., Ethernet network cards) can provide timestamps in hardware. However, in high-performance computing devices, such capabilities are not always available (i.e., the hardware is not capable of providing timestamps). To overcome the timestamp deficiency, some implementations use a software ping-pong benchmark to estimate round-trip times. However, such methods generally introduce software overhead attributable latencies that can be an order of magnitude larger than the network latency being measured.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
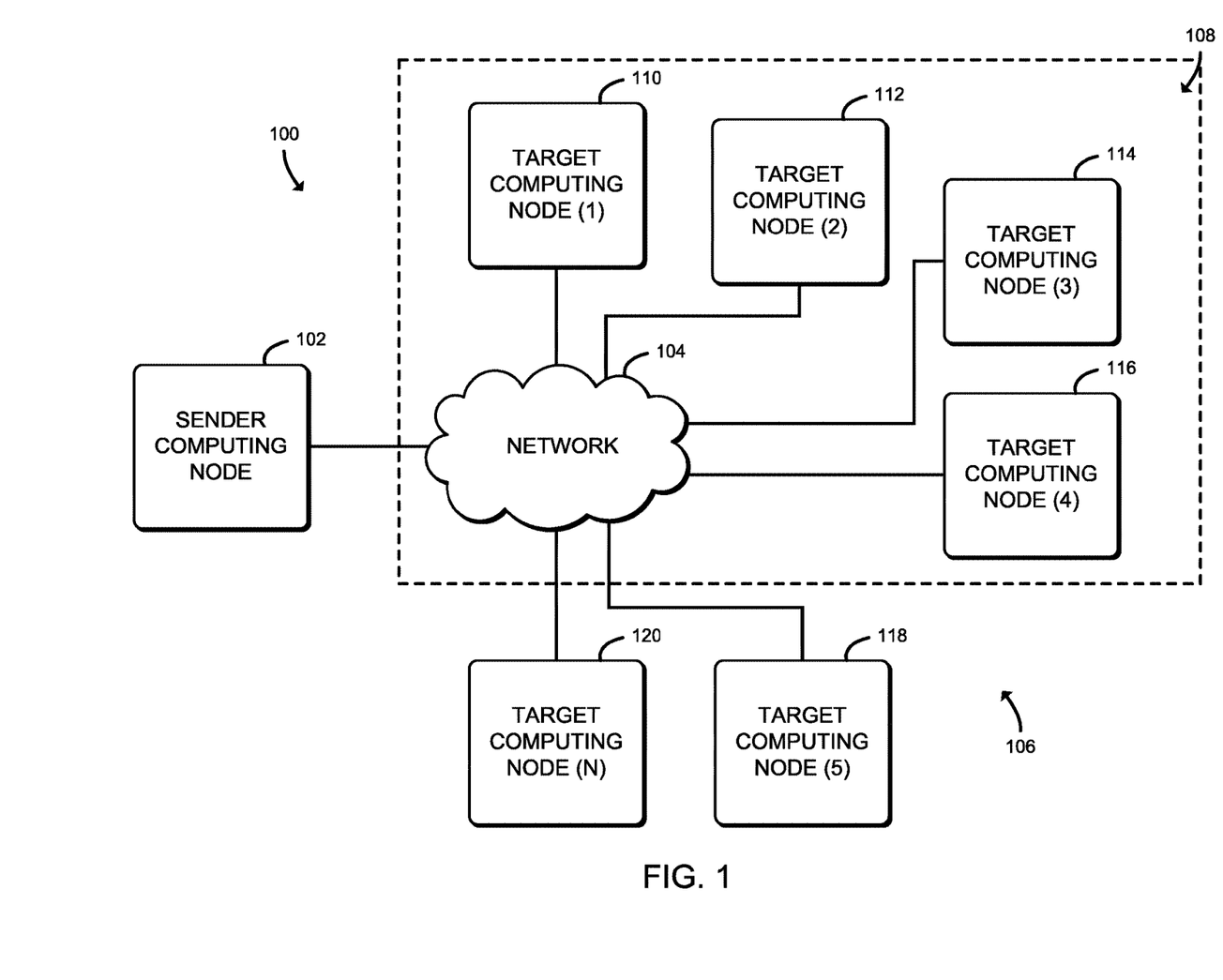
FIG. 1 is a simplified block diagram of at least one embodiment of a system for estimating network round-trip times that includes one or more computing nodes communicatively coupled over a network.

Referring now to FIG. 1, in an illustrative embodiment, a system 100 for estimating network round-trip times includes a sender computing node 102 communicatively coupled to multiple target computing nodes 106 over a network 104. In use, the sender computing node 102 transmits messages (e.g., network communications, network packets, etc.) to one or more of the target computing nodes 106 and receives messages from one or more of the target computing nodes 106. As shown in FIG. 1, the illustrative target computing nodes 106 include a target computing node 110, designated as target computing node (1), another target computing node 112, designated as target computing node (2), another target computing node 114, designated as target computing node (3), another target computing node 116, designated as target computing node (4), another target computing node 118, designated as target computing node (5), and another target computing node 120, designated as target computing node (N) (i.e., the "Nth" target computing node, wherein "N" is a positive integer and designates one or more additional target computing nodes).

The sender computing node 102 is configured to determine which of the target computing nodes 106 can be identified as neighboring computing nodes. To determine which of the target computing nodes 106 can be identified as neighboring computing nodes, as will be described below, the sender computing node 102 may use one or more criteria (e.g., from a policy) to determine which of the target computing nodes 106 can be identified as neighboring computing nodes 108. As shown in FIG. 1, the neighboring computing nodes 108 include the target computing node 110, the target computing node 112, the target computing node 114, and the target computing node 116 (i.e., a portion of the target computing nodes 106). Based on the determined set of neighboring computing nodes 108, the sender computing node 102 can determine multiple subsets of the set of neighboring computing nodes 108 (e.g., a number of subsets that each includes at least a portion of the target computing nodes 106). For example, the number of subsets of the set of neighboring computing nodes 108 may be equal to one more than the total number of neighboring computing nodes in the set of neighboring computing nodes 108, in some embodiments.

For each of the subsets of the set of neighboring computing nodes 108, a series of small (e.g., 0 bytes in size) probe messages (e.g., "put" messages) are generated and queued in a message queue (e.g., in hardware of the sender computing node 102). Each of the probe messages are configured to elicit a response message (i.e., an acknowledgment) from a corresponding one of the neighboring computing nodes 108 in the subset designated by the message. In use, as will be described further below, the sender computing node 102 utilizes a timer (e.g., a software-based timer) and a counter (e.g., a hardware-based counter) to control the transmission of the probe messages and receipt of the acknowledgment messages, the results of which can be used to estimate round-trip times between the sender computing node 102 and the neighboring computing nodes 108.

Figure 2:
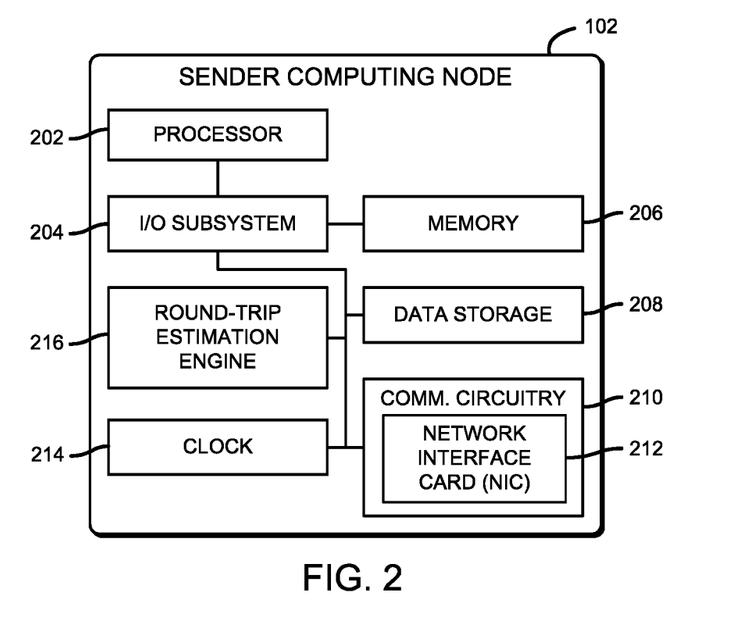
FIG. 2 is a simplified block diagram of at least one embodiment of the sender computing node of the system of FIG. 1.

The sender computing node 102 may be embodied as any type of computation or computing device capable of performing the functions described herein, including, without limitation, a server (e.g., stand-alone, rack-mounted, blade, etc.), a network appliance (e.g., physical or virtual), a web appliance, a distributed computing system, a processor-based system, a multiprocessor system, a smartphone, a mobile computing device, a tablet computer, a laptop computer, a notebook computer, and/or any other computing/communication device. As shown in FIG. 2, the illustrative sender computing node 102 includes a processor 202, an input/output (I/O) subsystem 204, a memory 206, a data storage device 208, communication circuitry 210, a clock 214, and a round-trip estimation engine 216. Of course, the sender computing node 102 may include other or additional components, such as those commonly found in a server (e.g., various input/output devices), in other embodiments. Additionally, in some embodiments, one or more of the illustrative components may be incorporated in, or otherwise form a portion of, another component. For example, the memory 206, or portions thereof, may be incorporated in the processor 202 in some embodiments. Further, in some embodiments, one or more of the illustrative components may be omitted from the sender computing node 102.

The processor 202 may be embodied as any type of processor capable of performing the functions described herein. For example, the processor 202 may be embodied as a single or multi-core processor(s), digital signal processor, microcontroller, or other processor or processing/controlling circuit. Similarly, the memory 206 may be embodied as any type of volatile or non-volatile memory or data storage capable of performing the functions described herein. In operation, the memory 206 may store various data and software used during operation of the sender computing node 102 such as operating systems, applications, programs, libraries, and drivers.

The memory 206 is communicatively coupled to the processor 202 via the I/O subsystem 204, which may be embodied as circuitry and/or components to facilitate input/output operations with the processor 202, the memory 206, and other components of the sender computing node 102. For example, the I/O subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processor 202, the memory 206, and other components of the sender computing node 102, on a single integrated circuit chip.

The data storage 208 may be embodied as any type of device or devices configured for short-term or long-term storage of data such as, for example, memory devices and circuits, memory cards, hard disk drives, solid-state drives, or other data storage devices. The data storage 208 and/or the memory 206 may store various data as described herein, including operating systems, applications, programs, libraries, drivers, instructions, etc., capable of being executed by a processor (e.g., the processor 202) of the receiver computing device 106.

The communication circuitry 210 may be embodied as any communication circuit, device, or collection thereof, capable of enabling communications between the sender computing node 102 and other remote devices (e.g., the neighboring computing nodes 108) over a network (e.g., the network 104). The communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication. In some embodiments, the communication circuitry 210 is configured to perform high-speed communication (e.g., in a high performance compute (HPC) cluster) with other computing devices (e.g., the neighboring computing nodes 108).

The illustrative communication circuitry 210 may be embodied as, or otherwise include, a network interface controller (NIC) 212. The NIC 212 may be embodied as one or more add-in-boards, daughtercards, network interface cards, controller chips, chipsets, or other devices that may be used by the sender computing node 102. For example, in some embodiments, the NIC 212 may be integrated with the processor 202, embodied as an expansion card coupled to the I/O subsystem 204 over an expansion bus (e.g., PCI Express), part of an SoC that includes one or more processors, or included on a multichip package that also contains one or more processors.

It should be appreciated that, in some embodiments, at least a portion of the functions of the round-trip estimation engine 216 as described herein may be included on or performed by the NIC 212. In other words, in some embodiments, the round-trip estimation engine 216 may be embodied as hardware circuitry of the NIC 212. As such, it should be further appreciated that, in such embodiments, the NIC 212 may include a processor (not shown) and/or a memory (not shown) that are local to the NIC 212. In such embodiments, the processor of the NIC 212 may be capable of performing the offloaded functions as described herein. Additionally or alternatively, in such embodiments, the memory of the NIC 212 may be capable of storing data locally, such that a state change of the sender computing node 102 is not affected (i.e., no software latency introduced).

The clock 214 may be embodied as any software, hardware component(s), and/or circuitry from which a duration of elapsed time can be determined therefrom and otherwise capable of performing the functions described herein. For example, in the illustrative embodiment, the clock 214 may be implemented via an on-chip oscillator. In some embodiments, the clock 214 may be shared (e.g., multiple distributed clocks being generally synchronized using a synchronization protocol).

The round-trip estimation engine 216 may be embodied as any software, hardware component(s), and/or circuitry capable of estimating network round-trip times between the sender computing node 102 and the neighboring computing nodes 108, as well as performing any of the other functions described herein. The round-trip estimation engine 216 may be configured to establish a message queue in hardware that is capable of storing probe messages, each of which can be sent to a different one of each of the neighboring computing nodes in a particular subset.

The round-trip estimation engine 216 may use the clock 214 to determine a duration of elapsed time, such as the amount of elapsed time between transmission of a first probe message of the message queue and receipt of the last acknowledgment in response to the last probe message of the message queue. The round-trip estimation engine 216 may be further configured to implement a counter that is capable of being incremented when each acknowledgment is received in response to the probe messages of the message queue. Accordingly, to determine whether to stop the clock 214, the round-trip estimation engine 216 can compare the counter (i.e., a value of the counter) to the number of initial probe messages generated for the message queue (i.e., the number of neighboring computing nodes in that particular subset).

Referring again to FIG. 1, the network 104 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Additionally, the network 104 may include any number of may include additional computing devices (i.e., networking devices) (not shown), physical and/or virtual, that may be commonly found in networks, such as servers, switches, routers, access points, network controllers, etc. It should be appreciated that, in some embodiments, the network 104 may be embodied as any type of parallel and/or distributed computing architecture (e.g., a high performance computing (HPC) network architecture) that is capable of high-speed, low-latency interconnectivity, such as a cluster computing network architecture and/or a grid computing network architecture (e.g., a fabric computing network architecture).

Similar to the sender computing node 102, each of the neighboring computing nodes 108 may be embodied as any type of computation or computing device capable of performing the functions described herein, including, without limitation, a server (e.g., stand-alone, rack-mounted, blade, etc.), a network appliance (e.g., physical or virtual), a web appliance, a distributed computing system, a processor-based system, a multiprocessor system, a smartphone, a mobile computing device, a tablet computer, a laptop computer, a notebook computer, and/or any other computing/communication device. Accordingly, it should be appreciated that each of the neighboring computing nodes 108 may include similar components to the illustrative sender computing node 102 of FIG. 2, which are not described herein for clarity of the description.

Figure 3:
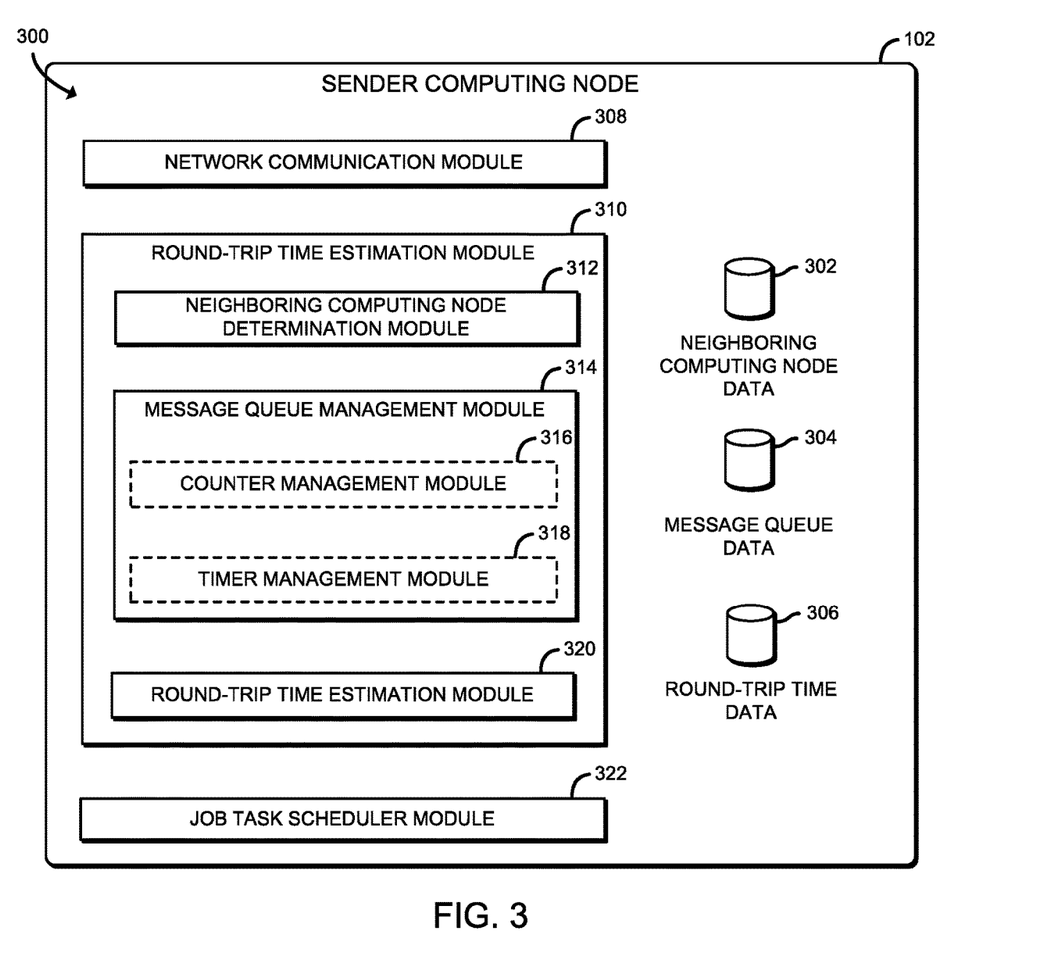
FIG. 3 is a simplified block diagram of at least one embodiment of an environment that may be established by the sender computing node of FIGS. 1 and 2.

Referring now to FIG. 3, in an illustrative embodiment, the sender computing node 102 establishes an environment 300 during operation. The illustrative environment 300 includes a network communication module 308, a round-trip time estimation module 310, and a job task scheduler module 322. Each of the modules, logic, and other components of the environment 300 may be embodied as hardware, software, firmware, or a combination thereof. For example, each of the modules, logic, and other components of the environment 300 may form a portion of, or otherwise be established by, the processor 202 or other hardware components of the sender computing node 102. As such, in some embodiments, one or more of the modules of the environment 300 may be embodied as a circuit or collection of electrical devices (e.g., network communication circuitry 308, round-trip time estimation circuitry 310, job task scheduler circuitry 322, etc.).

In the illustrative environment 300, the sender computing node 102 includes neighboring computing node data 302, message queue data 304, and round-trip time data 306, each of which may be accessed by the various modules and/or sub-modules of the sender computing node 102. It should be appreciated that the sender computing node 102 may include other components, sub-components, modules, sub-modules, circuitry, and/or devices commonly found in a computing node of a network, which are not illustrated in FIG. 3 for clarity of the description.

The network communication module 308 is configured to facilitate inbound and outbound network communications (e.g., network traffic, network packets, network flows, etc.) to and from the sender computing node 102. To do so, the network communication module 308 is configured to receive and process network packets from other computing devices (e.g., the neighboring computing nodes 108 and/or another computing node communicatively coupled via the network 104). Additionally, the network communication module 308 is configured to prepare and transmit network packets to another computing device (e.g., the neighboring computing nodes 108 and/or another computing node communicatively coupled via the network 104). Accordingly, in some embodiments, at least a portion of the functionality of the network communication module 308 may be performed by the communication circuitry 210, and more specifically by the NIC 212.

The round-trip time estimation module 310 is configured to estimate network round-trip times of the neighboring computing nodes 108 of the sender computing node 102. It should be appreciated that at least a portion of the round-trip time estimation module 310 may be performed in hardware of the sender computing node 102, such as by the round-trip estimation engine 216 of FIG. 2. To estimate network round-trip times of the neighboring computing nodes 108, the illustrative round-trip time estimation module 310 includes a neighboring computing node determination module 312, a message queue management module 314, and a round-trip time estimation module 320.

The neighboring computing node determination module 312 is configured to determine the neighboring computing nodes 108 of the sender computing node 102 (i.e., the set of neighboring computing nodes 108) from the target computing nodes 106 communicatively coupled to the sender computing node 102 via the network 104, as well as a number of subsets of the set of neighboring computing nodes 108. For example, the neighboring computing node determination module 312 may determine, as shown in the illustrative neighboring computing nodes 108 of FIG. 1, the neighboring computing nodes 108 include the target computing node 110, the target computing node 112, the target computing node 114, and the target computing node 116. In some embodiments, data that identifies which of the target computing nodes 106 communicatively coupled to the sender computing node 102 have been identified as neighboring computing nodes may be stored in the neighboring computing node data 302.

To make the determination, the neighboring computing node determination module 312 may rely on a policy that instructs the neighboring computing node determination module 312 on how to identify the set of neighboring computing nodes (i.e., the policy includes a predetermined criteria). The predetermined criteria may include any type of data that can be used to identify a neighboring computing node, such as a number of hops that the neighboring computing node is located in the network 104 from the sender computing node 102, a distance between the computing nodes (i.e., the sender computing node 102 and one of the target computing nodes 106), a region or geography assigned to the computing nodes (i.e., the sender computing node 102 and one of the target computing nodes 106), etc.

In furtherance of the previous example in which the illustrative set of neighboring computing nodes 108 includes four neighboring computing nodes, as shown in FIG. 1, the neighboring computing node determination module 312 may determine five subsets (i.e., one more subset than the total number of neighboring computing nodes 108) of neighboring computing nodes. For example, the first subset may include the target computing node 110, the target computing node 112, and the target computing node 114. The second subset may include the target computing node 112, the target computing node 114, and the target computing node 116. The third subset may include the target computing node 110, the target computing node 112, and the target computing node 116. The fourth subset may include the target computing node 110, the target computing node 114, and the target computing node 116. The fifth subset may include the target computing node 110 and the target computing node 116. It should be appreciated that, in some embodiments, additional and/or alternative subsets may be used.

The message queue management module 314 is configured to generate a message queue for each of the neighboring computing node subsets, such as those subsets determined by the neighboring computing node determination module 312. To do so, the message queue management module 314 generates a probe message (e.g., a 0-byte message, a "put" message, a low-overhead probe message, etc.) for each neighboring computing node of the message queue that is configured to elicit a response message (i.e., an acknowledgment message) from the receiving computing node (e.g., one of the identified neighboring computing nodes 108). It should be appreciated that, in some embodiments, the neighboring computing nodes 108 may receive the probe message and generate the response message in hardware to reduce round-trip latency and software overhead. Accordingly, in such embodiments, the type of probe message transmitted from the sender computing node 102 may include an indication that the probe message is to be processed in such a manner.

In some embodiments, data related to the message queues (e.g., a state of the message queue, an identifier of a logical or physical network interface associated with the message queue, etc.) may be stored in the message queue data 304. It should be appreciated that, in some embodiments, the generation of one message queue may be predicated upon another message queue having completed transmission of all the probe messages of the message queue. In other words, the different message queues (i.e., for each of the subsets of the set of neighboring computing nodes 108) may be generated at different times subject to the completion of another message queue.

The message queue management module 314 is further configured to manage the transmission of each probe message from the queue. To do so, the message queue management module 314 is configured to start a timer (e.g., using the clock 214 of FIG. 2) when the message queue includes probe messages for each neighboring computing node in the neighboring computing node subset and the first probe message is transmitted to one of the neighboring computing nodes 108, as designated by the probe message. Additionally, the message queue management module 314 is configured to receive a response message (i.e., an acknowledgment message) from the neighboring computing node that was designated by the most recently transmitted probe message.

When the response message is received, the message queue management module 314 is configured to increment a counter and determine whether the counter is equal to the number of neighboring computing nodes of the subset of neighboring computing nodes. Upon comparing the value of the counter to the number of neighboring computing nodes of the subset, the message queue management module 314 can either send another probe message from the message queue (e.g., when the counter is determined to be less than the number of neighboring computing nodes of the subset) or stop the timer (e.g., when the counter is determined to be equal to the number of neighboring computing nodes of the subset). It should be appreciated that, in some embodiments, the counter may be implemented in hardware to reduce the latency associated with software implementations. It should be further appreciated that, in some embodiments, the message queue management module 314 may perform one or more of the functions described herein using a counter management module 316 for managing the counter and/or a timer management module for managing the timer.

Figure 6:
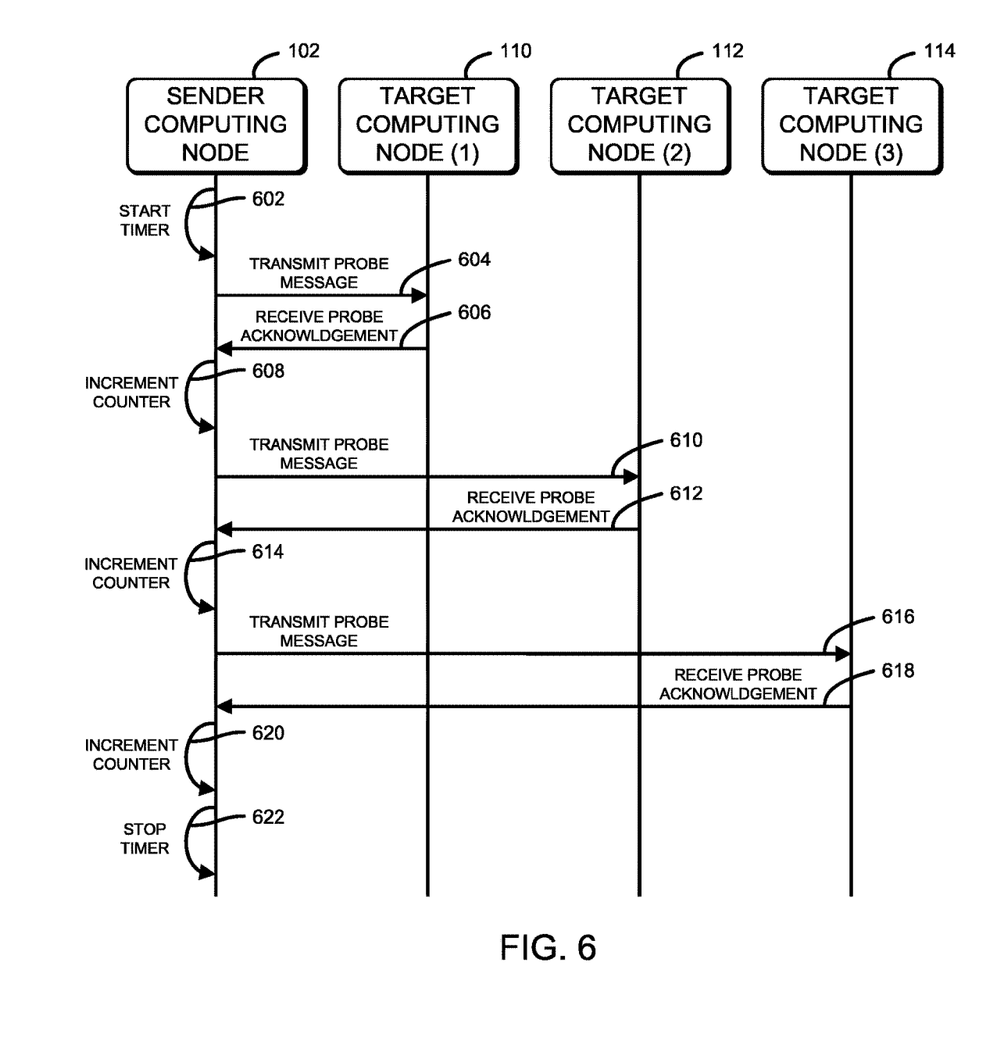
FIG. 6 is a simplified block diagram of a message flow for determining a round-trip time for a subset of neighboring computing nodes of the system of FIG. 1.

The round-trip time estimation module 320 is configured to estimate round-trip times for each of the neighboring computing nodes. To do so, the round-trip time estimation module 320 may generate an equation for each of the subsets of neighboring computing nodes. The round-trip time estimation module 320 may further estimate the round-trip times after a minimum number of equations have been generated. For example, in furtherance of the previous example and illustrated in FIG. 6, the first subset includes the target computing node 110, the target computing node 112, and the target computing node 114. The resulting equation may be generated according to the following:

$$sw + RTT_{110} + RTT_{112} + RTT_{114} = m_1 \quad \text{Equation 1}$$

wherein sw corresponds to a software overhead attributable to starting and stopping the clock; $RTT_{110}$ corresponds to a round-trip time of the target computing node 110; $RTT_{112}$ corresponds to a round-trip time of the target computing node 112; $RTT_{114}$ corresponds to a round-trip time of the target computing node 114; and $m_1$ corresponds to a duration of time to transfer the probe messages and receive acknowledgments for each of the neighboring computing nodes of the first subset.

Referring now to FIG. 6, an illustrative message flow 600 for determining a round-trip time for a subset of neighboring computing nodes includes the sender computing node 102 and the neighboring computing nodes 108 of FIG. 1. At step 602, the sender computing node 102 starts a timer. It should be appreciated that, in some embodiments, software logic may be employed to manipulate the timer (e.g., the clock 214 of FIG. 2), which may introduce overhead (i.e., latency) attributable to the running of the software. At step 604, the sender computing node 102 transmits a probe message to the target computing node 110. At step 606, the sender computing node 102 receives a probe acknowledgment (i.e., a response message) in response to the probe message from the target computing node 110. At step 608, the sender computing node 102 increments a counter and determines whether the counter matches the number of neighboring computing nodes of the subset. At step 610, the sender computing node 102 transmits a probe message to the target computing node 112. At step 612, the sender computing node 102 receives a probe acknowledgment (i.e., a response message) in response to the probe message from the target computing node 112. At step 614, the sender computing node 102 increments a counter and determines whether the counter matches the number of neighboring computing nodes of the subset. At step 616, the sender computing node 102 again transmits a probe message to the target computing node 114. At step 618, the sender computing node 102 again receives a probe acknowledgment (i.e., a response message) in response to the probe message from the target computing node 114. At step 620, the sender computing node 102 increments a counter and determines whether the counter matches the number of neighboring computing nodes of the subset. At step 622, the sender computing node stops the timer, which may introduce additional software latency.

Upon completion of the initial group of subsets of the neighboring computing nodes 108, as described previously, the following linear system of equations may be established:

$$sw + RTT_{110} + RTT_{112} + RTT_{114} = m_1$$

$$sw + RTT_{112} + RTT_{114} + RTT_{116} = m_2$$

$$sw + RTT_{110} + RTT_{114} + RTT_{116} = m_3$$

$$sw + RTT_{110} + RTT_{112} + RTT_{116} = m_4 \quad \text{Equation 2}$$

wherein $RTT_{116}$ corresponds to a round-trip time of the target computing node 116; and $m_x$ corresponds to a duration of time to transfer the probe messages and receive acknowledgments for each of the neighboring computing nodes of the "Xth" subset (i.e., the first through the fifth subsets). As a result, the round-trip time estimation module 320 may be configured to solve the set of linear equations (e.g., using the standard least squares method) as illustrated in Equation 2 to estimate round-trip times for each of the neighboring computing nodes 108, as well as estimate the software overhead. In some embodiments, the equations, the resulting round-trip time estimations, and/or the estimated software overhead duration may be stored in the round-trip time data 306.

Additionally, in some embodiments, the round-trip time estimation module 310 may be configured to dynamically update the estimated round-trip times. In such embodiments, the round-trip time estimation module 320 may be further configured to provide an indication to the message queue management module 314 that indicates the round-trip times have been estimated. Accordingly, in such embodiments, the message queue management module 314 may be configured to generate a new subset of the neighboring computing nodes in response to receiving the indication, which can be used to further refine and/or update the estimated round-trip times. Of course, in other embodiments, it should be appreciated that the message queue management module 314 may be configured to generate the new subset of the neighboring computing nodes automatically, such as after a predetermined period of time.

The job task scheduler module 322 is configured to schedule job tasks. To do so, in some embodiments, the job task scheduler module 322 may be configured to schedule the job tasks based at least in part on the estimated round-trip times as determined by the round-trip time estimation module 310. In such embodiments, the job task scheduler module 322 is configured to establish a static view of the network 104 based on the estimated round-trip times. Further, the job task scheduler module 322 may be configured to determine which job tasks to schedule at which neighboring computing nodes based on the static view of the network 104.

Figure 4:
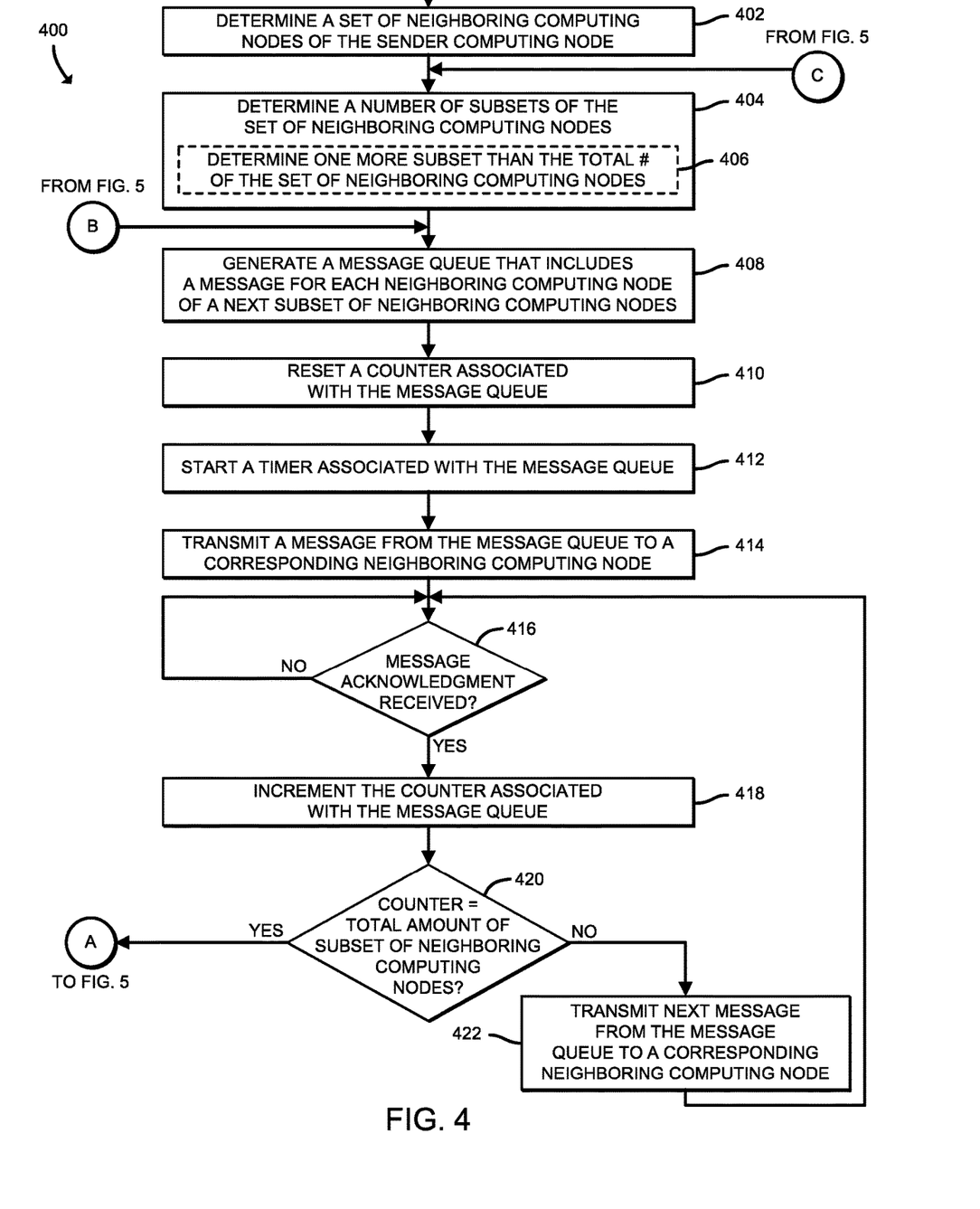
FIGS. 4 and 5 are a simplified flow diagram of at least one embodiment of a method for estimating network round-trip times that may be executed by the sender computing node of FIGS. 1 and 2.
Figure 5:
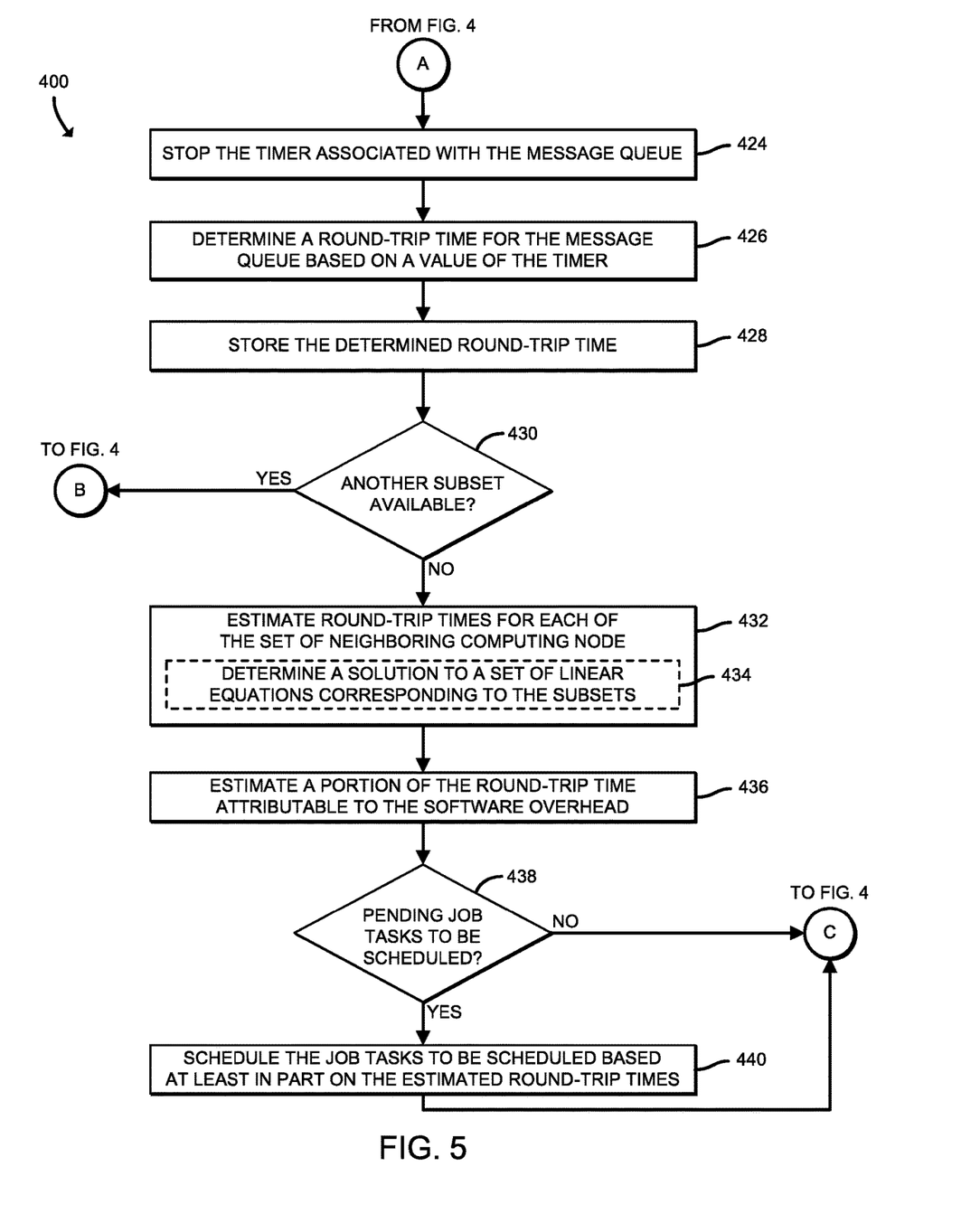

Referring now to FIGS. 4 and 5, in use, the sender computing node 102 may execute a method 400 for estimating network round-trip times of the neighboring computing nodes (e.g., the neighboring computing nodes 108 of FIG. 1). It should be appreciated that at least a portion of the method 400 may be offloaded to and executed by the round-trip estimation engine 216 of the sender computing node 102. The method 400 begins with block 402, in which the sender computing node 102 determines the set of neighboring computing nodes 108 of the sender computing node. In some embodiments, the set of neighboring computing nodes 108 may be determined from a plurality of target computing nodes 106, each in network communication with the sender computing node 102.

In block 404, the sender computing node 102 determines a number of subsets of the set of neighboring computing nodes. In some embodiments, in block 406, the sender computing node 102 determines a number of subsets equal to at least one more subset than the total number of the set of neighboring computing nodes 108 determined in block 402. In block 408, the sender computing node 102 generates a message queue that includes a probe message for each neighboring computing node of a next subset of neighboring computing nodes. In block 410, the sender computing node 102 resets a counter (i.e., sets the counter to zero) associated with the message queue generated in block 408. In block 412, the sender computing node 102 starts a timer associated with the message queue.

In block 414, the sender computing node 102 transmits the first probe message from the message queue to a corresponding neighboring computing node based on the probe message. It should be appreciated that, in some embodiments, a timestamp may be generated by a timing device (e.g., the clock 214) of the sender computing node 102 and stored local to the sender computing node 102 (e.g., in the memory 206 or data storage device 208) for future reference. In block 416, the sender computing node 102 determines whether a message acknowledgment was received from the neighboring computing device to which the probe message was transmitted in block 412. If not, the method 400 loops back to block 416 to continue to determine whether the message acknowledgment was received. Otherwise, if the message acknowledgment was received, the method 400 advances to block 418. In block 418, the sender computing node 102 increments a counter associated with the message queue.

In block 420, the sender computing node 102 determines whether a value of the counter is equal to a total amount of the subset of neighboring computing nodes. If not, the sender computing node 102 transmits the next probe message from the message queue to another neighboring computing node defined by the next probe message before the method returns to block 416 to determine whether a message acknowledgment was received in response to the next probe message transmitted in block 422. Otherwise, if the sender computing node 102 determines the value of the counter is equal to the total amount of the subset of neighboring computing nodes (i.e., all the probe messages in the message queue have been transmitted and response acknowledgment messages for each have been received), the method advances to block 424.

In block 424, the sender computing node 102 stops the timer associated with the message queue. It should be appreciated that, in some embodiments, another timestamp may be generated by the timing device (e.g., the clock 214) of the sender computing node 102 and stored local to the sender computing node 102 (e.g., in the memory 206 or data storage device 208) for comparison against the timestamp that may have been generated when the timer was started in block 412. In block 426, the sender computing node 102 determines a round-trip time based on the value of the timer (e.g., a timestamp) in block 412 as compared to the value of the timer (e.g., another timestamp) in block 424. In block 428, the sender computing node 102 stores the round-trip time determined in block 426.

In block 430, the sender computing node 102 determines whether another subset of neighboring computing nodes is available. If another subset of neighboring computing nodes is available, the method 400 returns to block 408, wherein the sender computing node 102 generates another message queue for the next subset of neighboring computing nodes that includes a probe message for each neighboring computing node of the next subset of neighboring computing nodes. Otherwise, if another subset of neighboring computing nodes is not available, the method 400 advances to block 432, wherein the sender computing node 102 estimates a round-trip time for each of the set of neighboring computing nodes based on the determined round-trip times for each subset of neighboring computing nodes. In some embodiments, in block 434, the sender computing node 102 determines the round-trip times by determining a solution to a set of linear equations corresponding to the subsets of the neighboring computing nodes.

In block 436, the sender computing node 102 estimates a portion of the round-trip time attributable to the software overhead. It should be appreciated that, in some embodiments, the estimated round-trip times determined in block 432 and the estimated software overhead determined in block 436 may be determined by the sender computing node 102 at the same time (e.g., inputting the software overhead into the linear equations of the subsets of the neighboring computing nodes). In block 438, the sender computing node 102 determines whether any pending job tasks are to be scheduled by the sender computing node 102. If job tasks are to be scheduled, the method advances to block 440, wherein the sender computing node 102 schedules the jobs tasks determined to be scheduled in block 438 at least in part on the estimated round-trip times before the method 400 returns to block 404. If there are not any job tasks to be scheduled, the method returns to block 404, wherein the sender computing node 102 determines a number of subsets of the set of neighboring computing nodes. It should be appreciated that on this and subsequent iterations, only one different subset may be generated to further refine or otherwise update the estimated round-trip times and software overhead.

It should be appreciated that, in some embodiments, the method 400 may be embodied as various instructions stored on a computer-readable media, which may be executed by the processor 202, the network interface controller 212, and/or other components of the sender computing node 102 to cause the sender computing node 102 perform the method 400. The computer-readable media may be embodied as any type of media capable of being read by the sender computing node 102 including, but not limited to, the memory 206, the data storage 208, local memory of the network interface controller 212, other memory or data storage devices of the sender computing node 102, portable media readable by a peripheral device of the sender computing node 102, and/or other media.

EXAMPLES

Illustrative examples of the technologies disclosed herein are provided below. An embodiment of the technologies may include any one or more, and any combination of, the examples described below.

Example 1 includes a sender computing node for determining a network round-trip time, the sender computing device includes one or more processors and one or more memory devices having stored therein a plurality of instructions that, when executed by the one or more processors, cause the sender computing node to determine a set of neighboring computing nodes; determine a plurality of subsets of neighboring computing nodes based on the set of neighboring computing nodes, wherein each of the plurality of subsets of neighboring computing nodes is linearly independent; generate a message queue for each subset of neighboring computing nodes, wherein each message queue includes a probe message for each neighboring computing node of the corresponding message queue; transmit each probe message of each message queue to a neighboring computing node designated by the corresponding probe message; receive an acknowledgment in response to each transmitted probe message; determine, in response to having received the acknowledgment in response to each of the transmitted probe messages for each message queue, a queue time for each message queue; and estimate a round-trip time for each neighboring computing node of the set of neighboring computing nodes based on the queue times of each message queue.

Example 2 includes the subject matter of Example 1, and wherein to determine the queue time for each message queue comprises to (i) start a timer associated with one of the message queues prior to transmitting a first probe message from the one of the message queues, (ii) increment a counter in response to receiving the acknowledgment in response to the first probe message, (iii) transmit, subsequent to incrementing the counter, a next probe message in the one of the message queues in response to a determination that the counter is not equal to a total number of messages in the message queue, (iv) increment the counter in response to receiving the acknowledgment in response to the next probe message, (v) determine whether the message queue includes another probe message, (vi) stop the timer associated with the one of the message queues, and (vii) determine a round-trip time for the one of the message queues based on a duration the timer ran between having started and stopped the timer.

Example 3 includes the subject matter of Example 1 or 2, and wherein to start and stop the timer comprises to start and stop the timer in software.

Example 4 includes the subject matter of any of Examples 1-3, and further comprising a hardware-based counter, wherein to increment the counter comprises to increment the hardware-based counter.

Example 5 includes the subject matter of any of Examples 1-4, and wherein to determine the plurality of subsets of neighboring computing nodes comprises to determine a number of subsets equal to one greater than a total number of the set of neighboring computing nodes.

Example 6 includes the subject matter of any of Examples 1-5, and wherein to estimate the round-trip time for each neighboring computing node of the set of neighboring computing nodes further comprises estimating a software overhead.

Example 7 includes the subject matter of any of Examples 1-6, and wherein the one or more memory devices, when executed by the one or more processors, causes the sender computing node to schedule one or more job tasks as a function of the estimated round-trip times.

Example 8 includes the subject matter of any of Examples 1-7, and wherein to determine the estimated round-trip time for each neighboring computing node comprises to perform a standard least squares calculation to a linear system of determined queue times.

Example 9 includes a method for estimating a network round-trip time, the method comprising determining, by a sender computing node, a set of neighboring computing nodes; determining, by the sender computing node, a plurality of subsets of neighboring computing nodes based on the set of neighboring computing nodes, wherein each of the plurality of subsets of neighboring computing nodes is linearly independent; generating, by the sender computing node, a message queue for each subset of neighboring computing nodes, wherein each message queue includes a probe message for each neighboring computing node of the corresponding message queue; transmitting, by the sender computing node, each probe message of each message queue to a neighboring computing node designated by the corresponding probe message; receiving, by the sender computing node, an acknowledgment in response to each transmitted probe message; determining, by the sender computing node and in response to having received the acknowledgment in response to each of the transmitted probe messages for each message queue, a queue time for each message queue; and estimating, by the sender computing node, a round-trip time for each neighboring computing node of the set of neighboring computing nodes based on the queue times of each message queue.

Example 10 includes the subject matter of Example 9, and wherein determining the queue time for each message queue comprises (i) starting a timer associated with one of the message queues prior to transmitting a first probe message from the one of the message queues, (ii) incrementing a counter in response to receiving the acknowledgment in response to the first probe message, (iii) transmitting, subsequent to incrementing the counter, a next probe message in the one of the message queues in response to a determination that the counter is not equal to a total number of messages in the message queue, (iv) incrementing the counter in response to receiving the acknowledgment in response to the next probe message, (v) determining whether the message queue includes another probe message, (vi) stopping the timer associated with the one of the message queues, and (vii) determining a round-trip time for the one of the message queues based on a duration the timer ran between starting and stopping the timer.

Example 11 includes the subject matter of Example 9 or 10, and wherein starting and stopping the timer comprises starting and stopping the timer in software.

Example 12 includes the subject matter of any of Examples 9-11, and wherein incrementing the counter comprises incrementing a hardware-based counter.

Example 13 includes the subject matter of any of Examples 9-12, and wherein determining the plurality of subsets of neighboring computing nodes comprises determining a number of subsets equal to one greater than a total number of the set of neighboring computing nodes.

Example 14 includes the subject matter of any of Examples 9-13, and wherein estimating the round-trip time for each neighboring computing node of the set of neighboring computing nodes further comprises estimating a software overhead.

Example 15 includes the subject matter of any of Examples 9-14, and further comprising scheduling, by the sender computing node, one or more job tasks as a function of the estimated round-trip times.

Example 16 includes the subject matter of any of Examples 9-15, and wherein determining the estimated round-trip time for each neighboring computing node comprises performing a standard least squares calculation to a linear system of determined queue times.

Example 17 includes a sender computing node comprising a processor; and a memory having stored therein a plurality of instructions that when executed by the processor cause the sender computing node to perform the method of any of Examples 9-16.

Example 18 includes one or more machine readable storage media comprising a plurality of instructions stored thereon that in response to being executed result in a sender computing node performing the method of any of Examples 9-16.

Example 19 includes a sender computing node for determining a network round-trip time, the sender computing device comprising neighboring node determination circuitry to (i) determine a set of neighboring computing nodes and (ii) determine a plurality of subsets of neighboring computing nodes based on the set of neighboring computing nodes, wherein each of the plurality of subsets of neighboring computing nodes is linearly independent; message queue management circuitry to (i) generate a message queue for each subset of neighboring computing nodes, wherein each message queue includes a probe message for each neighboring computing node of the corresponding message queue, (ii) transmit each probe message of each message queue to a neighboring computing node designated by the corresponding probe message, and (iii) receive an acknowledgment in response to each transmitted probe message; round-trip time determination circuitry (i) determine, in response to having received the acknowledgment in response to each of the transmitted probe messages for each message queue, a queue time for each message queue and (ii) estimate a round-trip time for each neighboring computing node of the set of neighboring computing nodes based on the queue times of each message queue.

Example 20 includes the subject matter of Example 19 and wherein to determine the queue time for each message queue comprises to (i) start a timer associated with one of the message queues prior to transmitting a first probe message from the one of the message queues, (ii) increment a counter in response to receiving the acknowledgment in response to the first probe message, (iii) transmit, subsequent to incrementing the counter, a next probe message in the one of the message queues in response to a determination that the counter is not equal to a total number of messages in the message queue, (iv) increment the counter in response to receiving the acknowledgment in response to the next probe message, (v) determine whether the message queue includes another probe message, (vi) stop the timer associated with the one of the message queues, and (vii) determine a round-trip time for the one of the message queues based on a duration the timer ran between having started and stopped the timer.

Example 21 includes the subject matter of Examples 19 or 20, and wherein to start and stop the timer comprises to start and stop the timer in software.

Example 22 includes the subject matter of any of Examples 19-21, and wherein to increment the counter comprises to increment a hardware-based counter of the sender computing device.

Example 23 includes the subject matter of any of Examples 19-22, and wherein to determine the plurality of subsets of neighboring computing nodes comprises to determine a number of subsets equal to one greater than a total number of the set of neighboring computing nodes.

Example 24 includes the subject matter of any of Examples 19-23, and wherein to estimate the round-trip time for each neighboring computing node of the set of neighboring computing nodes further comprises estimating a software overhead.

Example 25 includes the subject matter of any of Examples 19-24, and wherein the one or more memory devices, when executed by the one or more processors, causes the sender computing node to schedule one or more job tasks as a function of the estimated round-trip times.

Example 26 includes the subject matter of any of Examples 19-25, and wherein to determine the estimated round-trip time for each neighboring computing node comprises to perform a standard least squares calculation to a linear system of determined queue times.

Example 27 includes a sender computing node for estimating a network round-trip time, the sender computing node comprising means for determining a set of neighboring computing nodes; means for determining a plurality of subsets of neighboring computing nodes based on the set of neighboring computing nodes, wherein each of the plurality of subsets of neighboring computing nodes is linearly independent; means for generating a message queue for each subset of neighboring computing nodes, wherein each message queue includes a probe message for each neighboring computing node of the corresponding message queue; means for transmitting each probe message of each message queue to a neighboring computing node designated by the corresponding probe message; means for receiving an acknowledgment in response to each transmitted probe message; means for determining, in response to having received the acknowledgment in response to each of the transmitted probe messages for each message queue, a queue time for each message queue; and means for estimating a round-trip time for each neighboring computing node of the set of neighboring computing nodes based on the queue times of each message queue.

Example 28 includes the subject matter of Example 27, and wherein the means for determining the queue time for each message queue comprises means for (i) starting a timer associated with one of the message queues prior to transmitting a first probe message from the one of the message queues, (ii) incrementing a counter in response to receiving the acknowledgment in response to the first probe message, (iii) transmitting, subsequent to incrementing the counter, a next probe message in the one of the message queues in response to a determination that the counter is not equal to a total number of messages in the message queue, (iv) incrementing the counter in response to receiving the acknowledgment in response to the next probe message, (v) determining whether the message queue includes another probe message, (vi) stopping the timer associated with the one of the message queues, and (vii) determining a round-trip time for the one of the message queues based on a duration the timer ran between starting and stopping the timer.

Example 29 includes the subject matter of Example 28, and wherein the means for starting and stopping the timer comprises means for starting and stopping the timer in software.

Example 30 includes the subject matter of Example 28 or 29, and wherein the means for incrementing the counter comprises means for incrementing a hardware-based counter.

Example 31 includes the subject matter of any of Examples 28-30, and wherein the means for determining the plurality of subsets of neighboring computing nodes comprises means for determining a number of subsets equal to one greater than a total number of the set of neighboring computing nodes.

Example 32 includes the subject matter of any of Examples 28-31, and wherein the means for estimating the round-trip time for each neighboring computing node of the set of neighboring computing nodes further comprises means for estimating a software overhead.

Example 33 includes the subject matter of any of Examples 28-32, and further comprising means for scheduling one or more job tasks as a function of the estimated round-trip times.

Example 34 includes the subject matter of any of Examples 28-33, and wherein the means for determining the estimated round-trip time for each neighboring computing node comprises means for performing a standard least squares calculation to a linear system of determined queue times.

The invention claimed is:

1. A sender computing node for determining a network round-trip time, the sender computing node comprising:
   one or more processors; and
   one or more memory devices having stored therein a plurality of instructions that, when executed by the one or more processors, cause the sender computing node to:

determine a set of neighboring computing nodes;
determine a plurality of subsets of neighboring computing nodes based on the set of neighboring computing nodes, wherein each of the plurality of subsets of neighboring computing nodes is linearly independent relative to each of the other subsets of neighboring computing nodes of the plurality of subsets of neighboring computing nodes;
generate a message queue for each subset of neighboring computing nodes;
generate, for each message queue, a probe message for each of the neighboring computing nodes of the subset of neighboring computing nodes associated with that message queue;
transmit, for each message queue, each probe message to a corresponding one of the neighboring computing nodes associated with that probe message;
receive an acknowledgment in response to each transmitted probe message;
determine, in response to a received acknowledgement, a round-trip time for the neighboring computing node associated with the probe message that corresponds to the received acknowledgement;
determine, in response to having received a last acknowledgment in response to having transmitted a last probe message of each message queue, a duration of time for each message queue as a function of the round-trip times for each neighboring computing node of that message queue; and
determine an estimated round-trip time for each neighboring computing node of the set of neighboring computing nodes based on the duration of time of each message queue.

2. The sender computing node of claim 1, wherein to determine the duration of time for each message queue comprises to (i) start a timer associated with one of the message queues prior to transmitting the first probe message from the one of the message queues, (ii) increment a counter in response to receiving the acknowledgment in response to the first probe message, (iii) transmit, subsequent to incrementing the counter, a next probe message in the one of the message queues in response to a determination that the counter is not equal to a total number of messages in the message queue, (iv) increment the counter in response to receiving the acknowledgment in response to the next probe message, (v) determine whether the message queue includes another probe message, (vi) stop, in response to a determination that the message queue does not include another probe message, the timer associated with the one of the message queues, and (vii) determine the elapsed amount of time based on a duration of time the timer ran between having started and stopped the timer.

3. The sender computing node of claim 2, wherein to start and stop the timer comprises to start and stop the timer in software.

4. The sender computing node of claim 2, further comprising a hardware-based counter, wherein to increment the counter comprises to increment the hardware-based counter.

5. The sender computing node of claim 1, wherein to determine the plurality of subsets of neighboring computing nodes comprises to determine a number of subsets equal to one greater than a total number of the set of neighboring computing nodes.

6. The sender computing node of claim 1, wherein to estimate the round-trip time for each neighboring computing node of the set of neighboring computing nodes further comprises estimating a software overhead.

7. The sender computing node of claim 1, wherein the one or more memory devices, when executed by the one or more processors, causes the sender computing node to schedule one or more job tasks as a function of the estimated round-trip times.

8. The sender computing node of claim 1, wherein to determine the estimated round-trip time for each neighboring computing node comprises to perform a standard least squares calculation to a linear system of (i) the determined round-trip times for each neighboring computing node of each message queue and (ii) the determined duration of times of each message queue.

9. One or more non-transitory, computer-readable storage media comprising a plurality of instructions stored thereon that in response to being executed cause a computing device to:
determine a set of neighboring computing nodes;
determine a plurality of subsets of neighboring computing nodes based on the set of neighboring computing nodes, wherein each of the plurality of subsets of neighboring computing nodes is linearly independent relative to each of the other subsets of neighboring computing nodes of the plurality of subsets of neighboring computing nodes;
generate a message queue for each subset of neighboring computing nodes;
generate, for each message queue, a probe message for each of the neighboring computing nodes of the subset of neighboring computing nodes associated with that message queue;
transmit, for each message queue, each probe message to a corresponding one of the neighboring computing nodes associated with that probe message;
receive an acknowledgment in response to each transmitted probe message;
determine, in response to a received acknowledgement, a round-trip time for the neighboring computing node associated with the probe message that corresponds to the received acknowledgement;
determine, in response to having received a last acknowledgment in response to having transmitted a last probe message of each message queue, a duration of time for each message queue as a function of the round-trip times for each neighboring computing node of that message queue; and
determine an estimated round-trip time for each neighboring computing node of the set of neighboring computing nodes based on the duration of times of each message queue.

10. The one or more non-transitory, computer-readable storage media of claim 9, wherein to determine the duration of time for each message queue comprises to (i) start a timer associated with one of the message queues prior to transmission of the first probe message from the one of the message queues, (ii) increment a counter in response to receiving the acknowledgment in response to the first probe message, (iii) transmit, subsequent to incrementing the counter, a next probe message in the one of the message queues in response to a determination that the counter is not equal to a total number of messages in the message queue, (iv) increment the counter in response to receiving the acknowledgment in response to the next probe message, (v) determine whether the message queue includes another probe message, (vi) stop, in response to a determination that the message queue does not include another probe message, the timer associated with the one of the message queues, and (vii) determine the elapsed amount of time based on a duration of time the timer ran between having started and stopped the timer.

11. The one or more non-transitory, computer-readable storage media of claim 10, wherein to start and stop the timer comprises to start and stop the timer in software.

12. The one or more non-transitory, computer-readable storage media of claim 10, wherein to increment the counter comprises to increment a hardware-based counter of the sender computing device.

13. The one or more non-transitory, computer-readable storage media of claim 9, wherein to determine the plurality of subsets of neighboring computing nodes comprises to determine a number of subsets equal to one greater than a total number of the set of neighboring computing nodes.

14. The one or more non-transitory, computer-readable storage media of claim 9, wherein to estimate the round-trip time for each neighboring computing node of the set of neighboring computing nodes further comprises estimating a software overhead.

15. The one or more non-transitory, computer-readable storage media of claim 9, wherein the one or more memory devices, when executed by the one or more processors, causes the sender computing node to schedule one or more job tasks as a function of the estimated round-trip times.

16. The one or more non-transitory, computer-readable storage media of claim 9, wherein to determine the estimated round-trip time for each neighboring computing node comprises to perform a standard least squares calculation to a linear system of determined queue times.

17. A method for estimating a network round-trip time, the method comprising:
   determining, by a sender computing node, a set of neighboring computing nodes;
   determining, by the sender computing node, a plurality of subsets of neighboring computing nodes based on the set of neighboring computing nodes, wherein each of the plurality of subsets of neighboring computing nodes is linearly independent relative to each of the other subsets of neighboring computing nodes of the plurality of subsets of neighboring computing nodes;
   generating, by the sender computing node, a message queue for each subset of neighboring computing nodes;
   generating, by the sender computing node for each message queue, a probe message for each of the neighboring computing nodes of the subset of neighboring computing nodes associated with that message queue;
   transmitting, by the sender computing node for each message queue, each probe message to a corresponding one of the neighboring computing nodes associated with that probe message;
   receiving, by the sender computing node, an acknowledgment in response to each transmitted probe message;
   determining, by the sender computing node and in response to a received acknowledgement, a round-trip time for the neighboring computing node associated with the probe message that corresponds to the received acknowledgement;
   determining, by the sender computing node and in response to having received a last acknowledgment in response to having transmitted a last probe message of each message queue, a duration of time for each message queue as a function of the round-trip times for each neighboring computing node of that message queue; and
   determining, by the sender computing node, an estimated round-trip time for each neighboring computing node of the set of neighboring computing nodes based on the duration of times of each message queue.

18. The method of claim 17, wherein determining the duration of time for each message queue comprises (i) starting a timer associated with one of the message queues prior to transmission of the first probe message from the one of the message queues, (ii) incrementing a counter in response to receiving the acknowledgment in response to the first probe message, (iii) transmitting, subsequent to incrementing the counter, a next probe message in the one of the message queues in response to a determination that the counter is not equal to a total number of messages in the message queue, (iv) incrementing the counter in response to receiving the acknowledgment in response to the next probe message, (v) determining whether the message queue includes another probe message, (vi) stopping, in response to a determination that the message queue does not include another probe message, the timer associated with the one of the message queues, and (vii) determining the elapsed amount of time based on a duration of time the timer ran between having started and stopped the timer.

19. The method of claim 18, wherein starting and stopping the timer comprises starting and stopping the timer in software.

20. The method of claim 17, wherein determining the plurality of subsets of neighboring computing nodes comprises determining a number of subsets equal to one greater than a total number of the set of neighboring computing nodes.

21. The method of claim 17, wherein estimating the round-trip time for each neighboring computing node of the set of neighboring computing nodes further comprises estimating a software overhead.

22. The method of claim 17, further comprising scheduling, by the sender computing node, one or more job tasks as a function of the estimated round-trip times.

23. The method of claim 17, wherein determining the estimated round-trip time for each neighboring computing node comprises performing a standard least squares calculation to a linear system of determined queue times.

24. A sender computing node for estimating a network round-trip time, the sender computing node comprising:
   circuitry for determining a set of neighboring computing nodes;
   circuitry for determining a plurality of subsets of neighboring computing nodes based on the set of neighboring computing nodes, wherein each of the plurality of subsets of neighboring computing nodes is linearly independent relative to each of the other subsets of neighboring computing nodes of the plurality of subsets of neighboring computing nodes;
   circuitry for generating a message queue for each subset of neighboring computing nodes, wherein each message queue includes a probe message for each neighboring computing node of the corresponding message queue;
   network communication circuitry to (i) transmit, for each message queue, each probe message to a corresponding one of the neighboring computing nodes associated with that probe message and (ii) receive an acknowledgment in response to each transmitted probe message;
   circuitry for determining, in response to a received acknowledgement, a round-trip time for the neighboring computing node associated with the probe message that corresponds to the received acknowledgement;

circuitry for determining, in response to having received a last acknowledgment in response to having transmitted a last probe message of each message queue, a duration of time for each message queue as a function of the round-trip times for each neighboring computing node of that message queue; and circuitry for determining an estimated round-trip time for each neighboring computing node of the set of neighboring computing nodes based on the duration of time of each message queue.

25. The sender computing node of claim 24, wherein the circuitry for determining the duration of time for each message queue comprises circuitry for (i) starting a timer associated with one of the message queues prior to prior to transmitting the first probe message from the one of the message queues, (ii) incrementing a counter in response to receiving the acknowledgment in response to the first probe message, (iii) transmitting, subsequent to incrementing the counter, a next probe message in the one of the message queues in response to a determination that the counter is not equal to a total number of messages in the message queue, (iv) incrementing the counter in response to receiving the acknowledgment in response to the next probe message, (v) determining whether the message queue includes another probe message, (vi) stopping, in response to a determination that the message queue does not include another probe message, the timer associated with the one of the message queues, and (vii) determining the elapsed amount of time based on a duration of time the timer ran between having started and stopped the timer.

* * * * *